June 29, 1937. W. P. VAN LAMMEREN 2,085,484
MEAT CUTTING MACHINE
Filed Aug. 15, 1932 5 Sheets-Sheet 1

Inventor
W. P. Van Lammeren
By: Glascock Downing & Seebold
Attorneys

June 29, 1937.  W. P. VAN LAMMEREN  2,085,484
MEAT CUTTING MACHINE
Filed Aug. 15, 1932  5 Sheets-Sheet 2

INVENTOR:
W. P. Van Lammeren
BY
ATTORNEYS.

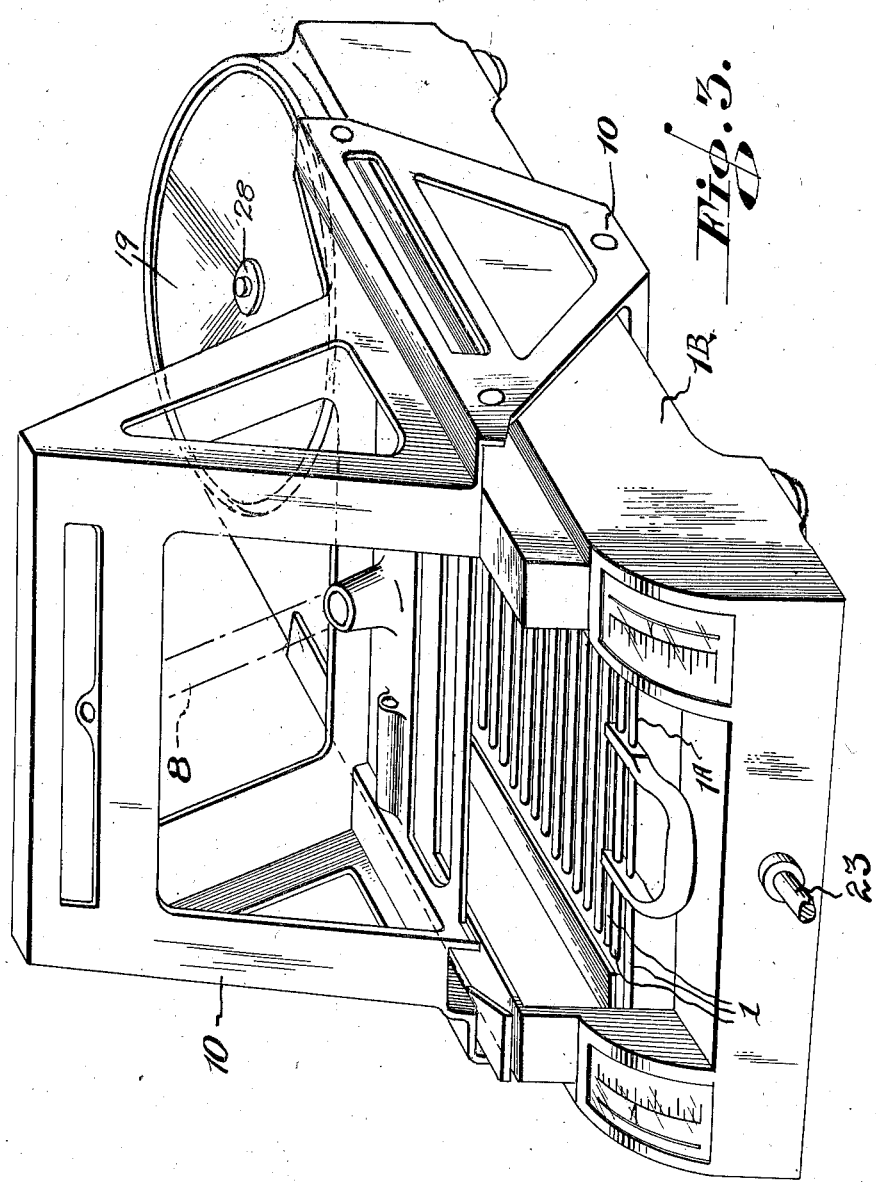

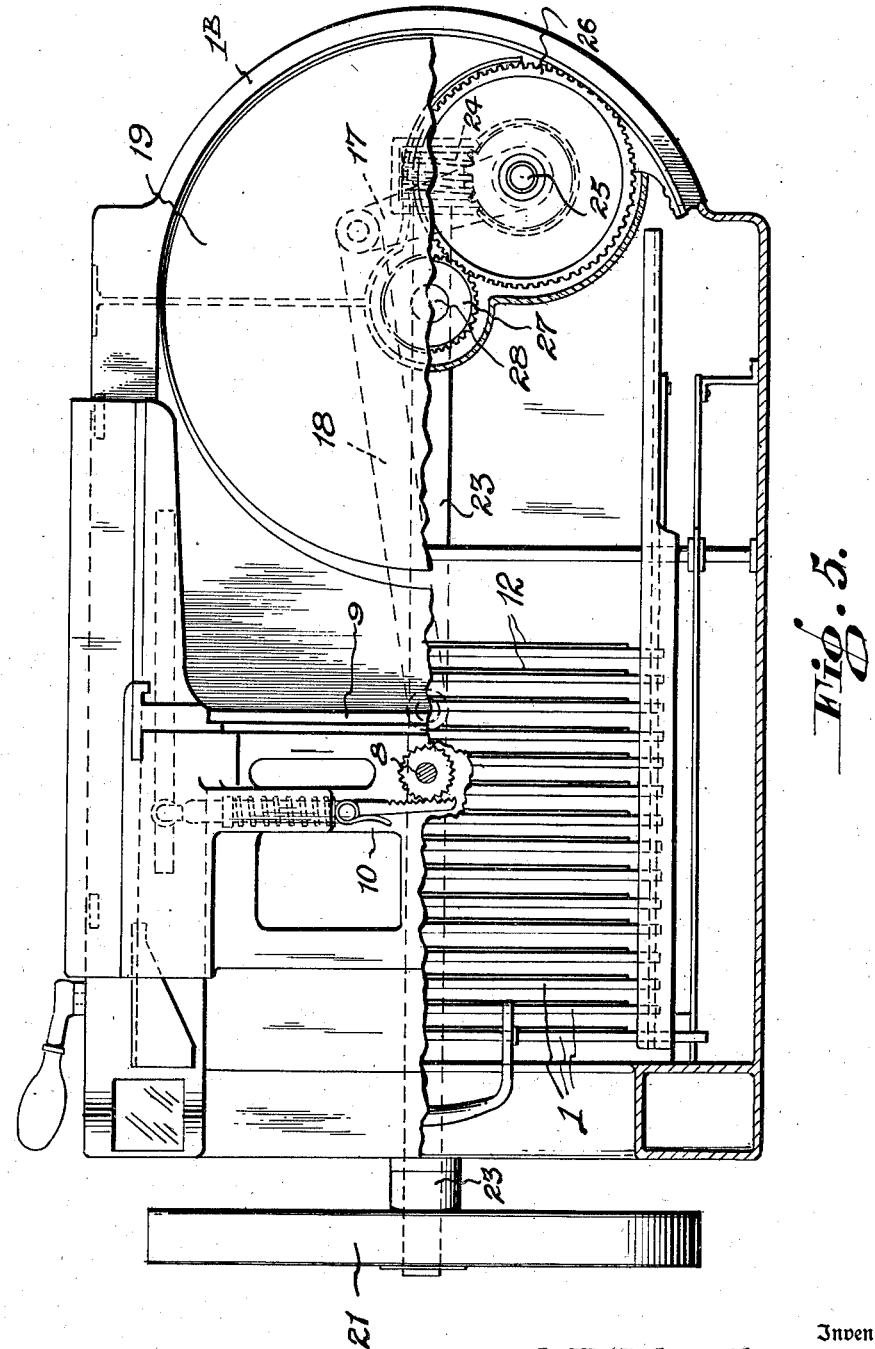

INVENTOR.
W. P. Van Lammeren
BY Glascock Downing Seebold
ATTORNEYS.

Patented June 29, 1937

2,085,484

UNITED STATES PATENT OFFICE 2,085,484

MEAT CUTTING MACHINE

Willem P. van Lammeren, Voorschoten, Netherlands

Application August 15, 1932, Serial No. 628,909
In the Netherlands August 15, 1931

3 Claims. (Cl. 146—105)

This invention relates to slicing machines for meat or other material in which the sliced material is received automatically and stacked till it is taken away from the machine.

The existing slicing machines of similar type comprising a horizontal or inclined knife and a moving platform provided thereunder in order to receive the formed slices, have a very important drawback. The construction of the inflexible platform which has to receive the slices necessitates that there must be a considerable distance between this platform and the knife, so that the slice is not supported as soon as it is formed, but the front end is hanging down and as the slice is received in this position, it will be situated on the platform in folded manner after it is cut off and no regular pile of slices is obtained and it is the object of the present invention to avoid this drawback.

Figure 1:
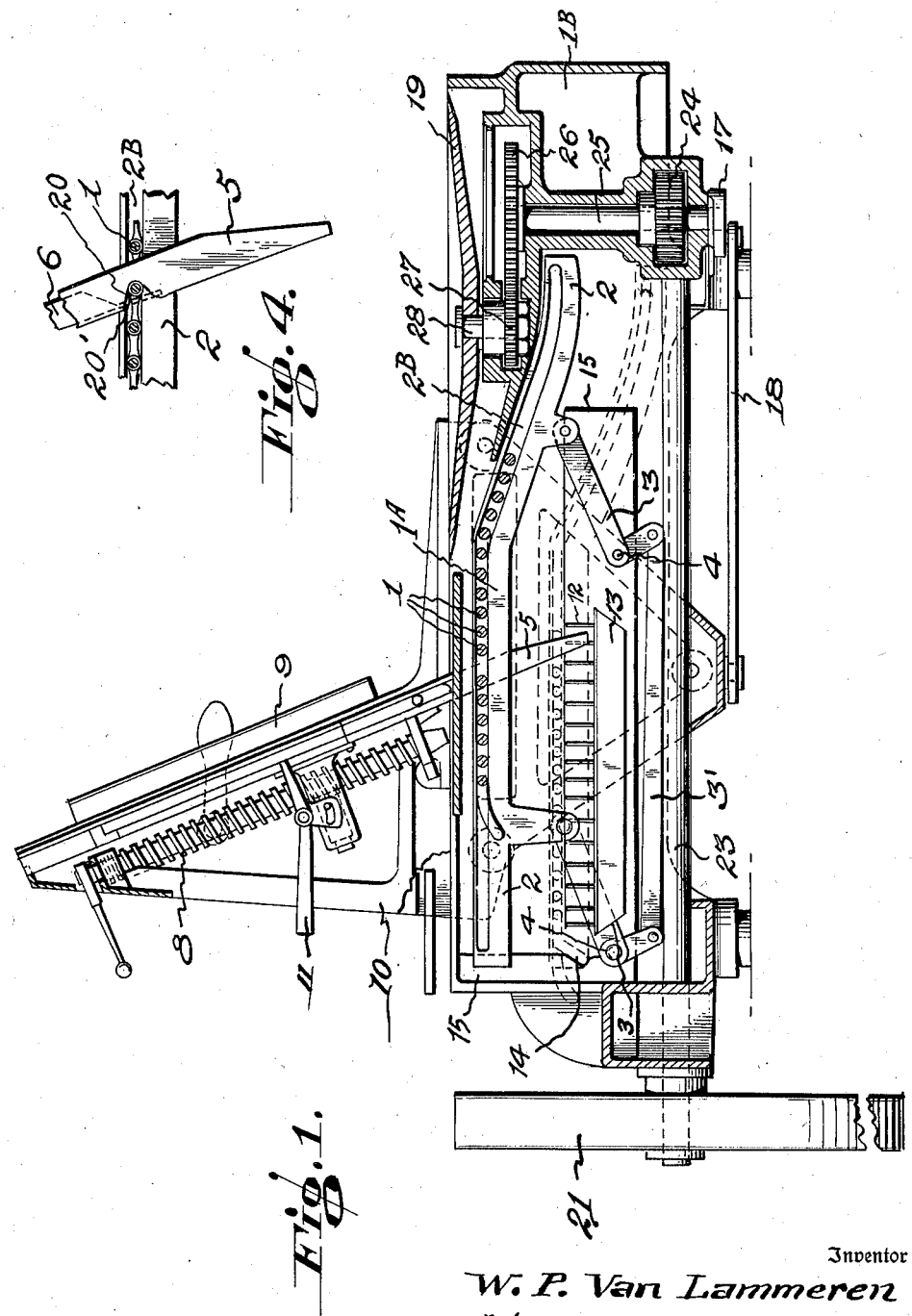
Figure 2:
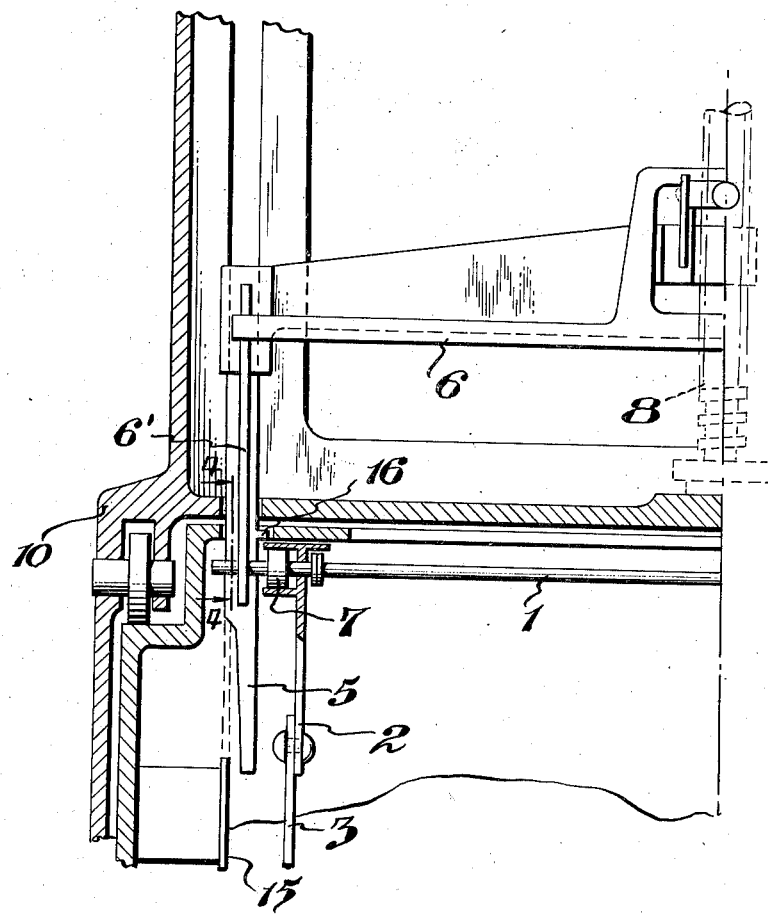
Figure 6:
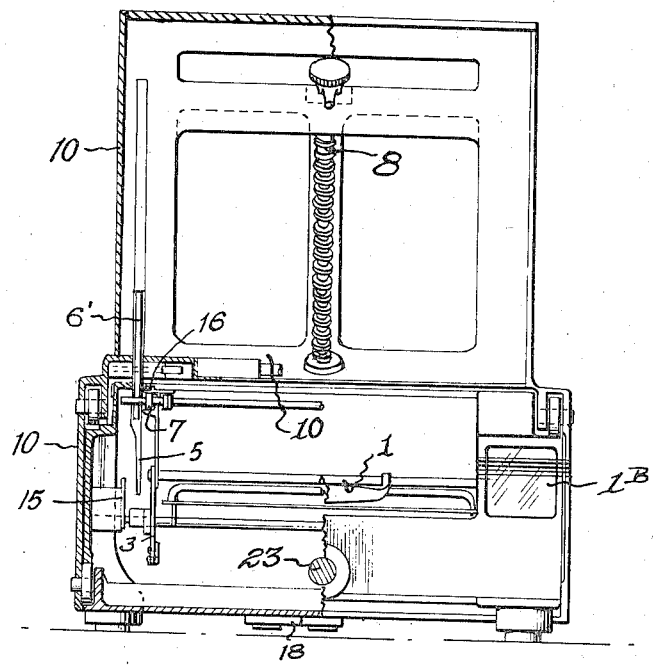
Figure 7:
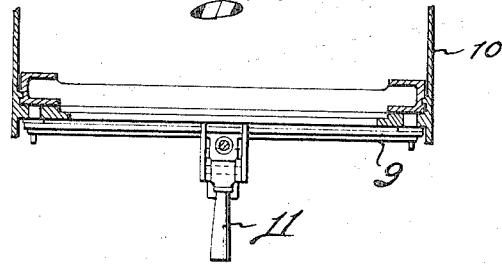
Figure 8:
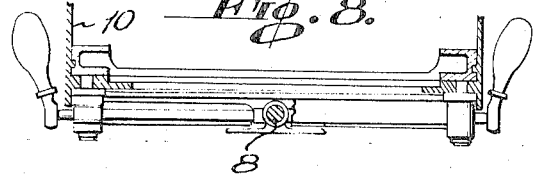

In the accompanying drawings forming part of this specification, in which like numbers of reference denote like parts wherever they occur, Figure 1 is a vertical longitudinal sectional view, Figure 2 is a fragmentary transverse vertical sectional view, Figure 3 is a perspective view of the machine, Figure 4 is an enlarged fragmentary elevational detail of the locking means between the grate and movable frame taken on lines 4—4 of Fig. 2, Fig. 5 is a top plan view of the machine partly in section, Fig. 6 is a front elevation of the machine partly in section, Fig. 7 is a detail sectional view of bit lifting mechanism, and Fig. 8 is a detail sectional view of the slide clamping mechanism.

A flexible platform (grate) IA is arranged beneath the horizontal knife 19, to receive the slices, which are formed.

This platform IA moves in unison with the upper table 10 of the machine and comprises a sheet of suitable material or a number of rods I (see Figures 1 and 2), which are flexibly connected one to another by links and which slide in grooves 2B in bars 2 on both sides of the machine frame IB.

These guide bars 2 are supported by the upper branches of bell crank levers 3, which are fulcrumed about the pins 4 fixed to the frame IB. The guide bars therefore can move together around the pins 4 to a certain extent. The lower branches of the bell crank lever are connected by a link 3' in order to obtain a regular descending movement of the guide bars 2.

The fly-wheel 21 is mounted on the outer end of the shaft 23. Shaft 23 engages with a gear 24 carried by shaft 25. Shaft 25 has a gear 26 mounted on its upper end, which gear meshes with a pinion 27, which is mounted on the lower end of the blade shaft 28. Shaft 25 is provided at its lower end with a crank 17. Crank 17 is connected by a rod 18 to the bottom portion of the upper table 10.

One of the rods I of the platform (grate) IA extends out of the side bars 2 in a notch 20 of the frame 5 (see Figure 4), in which notch 20 the rod I is locked by the bit 20' on the vertical slidable frame 6. A roller 7 on the rod I is used to reduce the friction between this rod I and the side bars 2 when the side bars 2 and, also, the grate IA in due course are directed downwardly by the frame 5, which receives its vertical motion on the upper table 10 by a half-nut on the feed screw spindle 8. The downward motion of the grate is thus in accordance with the thickness of the slice.

The working of the mechanism is as follows: The meat or other material which is to be sliced is fastened in suitable manner on the slide 9 (Figure 1). This slide is directed downward by a half-nut (not shown) in mesh with the threaded spindle 8.

The upper table 10, which carries the slide 9, is directed toward and from the knife in the usual manner by a crank 17 and a connecting-rod 18.

Turning the fly-wheel 21 will rotate the shaft 23. The shaft 23 engages shaft 25 and the gear 26 on the shaft 25 will mesh with pinion 27, and the rotary blade 19 will be rotated. At the same time, when shaft 25 is rotating, it will turn crank 17, which will reciprocate the upper table to and from the rotary knife 19. The grate IA and slide 9, being connected to the upper table 10 by the bit end of the frame 6, fastened to the end of one of the rods I of the grate IA, will reciprocate with the upper table 10.

As one of the rods I is locked in a notch 20 of the frame 5, which is mounted on the upper table 10 and only the platform (grate) IA formed by the rods I moves vertically slidable in unison with the upper table to and from the knife, and as the frame 5 is directed downward by a half-nut in mesh with the threaded spindle 8, which spindle is also used for the motion of the slide 9, the frame 5 and the platform IA move downwards in unison with the slide 9. Frame 5 is connected to slide 9, carrying the material to be sliced toward the rotary knife 19.

Furthermore, if the bit 20' of the slidable frame 6 is lifted by the lever 11, the engaged bar 1 is released from the notch 20 in the frame and the whole grate 1 can be pulled by hand to the front of the machine. The rods 1 slide in the grooves 2B in the side bars 2. When positioned at the front of the machine the grate 1A, together with the bars 2, are pressed down by hand in such manner that the rods 1 are directed exactly between the backs 12 of the temporary supporting plate 13. In order to ensure that the rods 1 come exactly between the backs of the plate 13, a notch 14 is made in the fixed side plate 15 and the foremost of the rods 1 is pressed down into this notch. This engagement is not hampered by the upper branches of the bell crank levers 3 as they swing about the pins 4 to a position shown in dotted lines in Fig. 1.

After the sliced material has been removed from the platform 1A, the rods 1 and side bars 2 are lifted, and, in order to obtain the former position of the bars, a stop 16 (Figure 2) is fixed on the frame 5, which stop limits the upward motion of the bars 2. The rods 1 are now pushed back till the extending rod 1 stops in the notch 20 of the frame 5 and is locked by the bit 20' of the frame 6. Now the mechanism is ready again for use.

The slices are accumulated on the grate formed by the bars 1, which grate moves to and from the knife together with the upper table with the piece of meat to be sliced. Immediately as a slice is being cut its forward edge and then the complete slice falls flat on the bars 1 and the following slice falls just over the last one. The guides 2 descend as the pile of slices increases.

Having thus fully described this invention, I hereby reserve the benefit of all changes in form, arrangement, order or use of parts, as it is evident that many minor changes may be made therein without departing from the spirit of this invention or the scope of the following claims.

I claim:

1. A slicing machine for meat or other material, comprising a frame, a substantially horizontally disposed and rotatable disc-knife thereon, a work holder movable in a substantially horizontal plane toward and away from the knife, a flexible platform arranged under the knife and the work holder for receiving and stacking the formed slices, curved and grooved guides mounted for vertical and rocking movement in the frame for movably supporting the platform close under the edge of the knife so as to support the slices immediately from the moment of starting the cutting of each slice and allowing descending of the platform with the work as the slicing proceeds, and coupling means between a part of the platform and the work holder for giving the platform a to-and-fro movement in the guides when the machine is operated.

2. A slicing machine as claimed in claim 1, wherein the coupling means is of a disengageable type in order that the platform may be moved forwardly in the frame independently of the operation of the work holder.

3. A slicing machine as claimed in claim 1, wherein the coupling means is of a disengageable type so that the platform may be disconnected from the work holder and moved independently thereof, said platform including a series of flexibly connected rods, means situated at the front of the machine for releasably engaging the foremost rod in order to releasably hold the platform at the front of the machine.

WILLEM P. van LAMMEREN.